United States Patent [19]
Bryan

[11] Patent Number: 5,987,979
[45] Date of Patent: Nov. 23, 1999

[54] METHOD AND APPARATUS FOR DETECTING RAILTRACK FAILURES BY COMPARING DATA FROM A PLURALITY OF RAILCARS

[75] Inventor: Michael A. Bryan, Los Gatos, Calif.

[73] Assignee: Cairo Systems, Inc., Los Gatos, Calif.

[21] Appl. No.: 09/201,326

[22] Filed: Nov. 30, 1998

Related U.S. Application Data

[63] Continuation of application No. 08/829,771, Mar. 31, 1997
[60] Provisional application No. 60/014,701, Apr. 1, 1996.

[51] Int. Cl.$^6$ ........................................................ B61K 9/00
[52] U.S. Cl. ................................ 73/146; 33/1 Q; 33/651
[58] Field of Search ............................... 73/146; 33/1 Q, 33/651

[56] References Cited

U.S. PATENT DOCUMENTS

| | | | |
|---|---|---|---|
| 3,775,859 | 12/1973 | Sauterel | 33/338 |
| 3,940,597 | 2/1976 | DiMatteo | 235/150.2 |
| 4,027,840 | 6/1977 | Blair | 246/122 R |
| 4,071,282 | 1/1978 | Callahan et al. | 303/106 |
| 4,361,301 | 11/1982 | Rush | 246/34 R |
| 4,531,300 | 7/1985 | Heidel et al. | 33/366 |
| 4,599,620 | 7/1986 | Evans | 343/357 |
| 4,711,418 | 12/1987 | Aver, Jr. et al. | 246/5 |
| 4,741,207 | 5/1988 | Spangler | 73/146 |
| 4,768,740 | 9/1988 | Corrie | 246/2 S |
| 4,894,662 | 1/1990 | Counselman | 342/357 |
| 4,903,212 | 2/1990 | Yokouchi et al. | 364/449 |
| 4,924,402 | 5/1990 | Ando et al. | 364/449 |
| 4,989,151 | 1/1991 | Nuimura | 364/449 |
| 5,129,605 | 7/1992 | Burns et al. | 246/5 |
| 5,225,842 | 7/1993 | Brown et al. | 342/357 |
| 5,247,338 | 9/1993 | Danneskiold-Samsoe et al. | 356/1 |
| 5,341,683 | 8/1994 | Searle | 73/597 |

(List continued on next page.)

OTHER PUBLICATIONS

Vantuono, W., "Mapping New roles for GIS", Simmons-Boardman Publishing Corp. (1995), 5 pages.

Desai, C.S., et al., "Constitutive modeling for materials in track support structures" *Transportation Research Record* (1988) 939:10–18.

Dialog File 63:TRIS Abstract of Marowski, G., "Analysis of the mathematical model of the railway track bed" *Rail International* (1978) 9(6):397–431.

Graf et al., "Locating railroad rack bed subsurface defects utilizing nondestructive remote sensing technologies" *SPIE* (1994) 2245:188–195.

Hayre, H.S., "Automated railroad track inspection" *IEEE Transactions on Industry Applications* (1974) IA–10(3):380–384.

(List continued on next page.)

*Primary Examiner*—Joseph L. Felber
*Attorney, Agent, or Firm*—Townsend and Townsend and Crew LLP

[57] ABSTRACT

A technique for monitoring anomalies in a railway system 400 to predict a future track behavior. The technique uses a motion sensor 207, 209 operably coupled to a chassis of a rail car 101 to detect a possibility of an event which may correspond to an anomaly in the railway system. A global positioning sensor (GPS) 213 operably coupled to the chassis detects a geographical location of the rail car 101 at a time corresponding to the event, which correlates the anomaly to the geographical location and the time. The technique also uses a processor 301 operably coupled to the motion sensor 207, 209 to direct a signal corresponding to the event and a recorder 215 operably coupled to the processor 301 to log the signal which may correspond to the anomaly and the geographical location of the rail car corresponding to the event. A central station 104 tracks and analyzes the anomaly over time to predict a possible defect in the railway system using a record of the events over time.

16 Claims, 6 Drawing Sheets

U.S. PATENT DOCUMENTS

| | | | |
|---|---|---|---|
| 5,344,105 | 9/1994 | Youhanaie | 244/3.14 |
| 5,386,727 | 2/1995 | Searle | 73/602 |
| 5,433,111 | 7/1995 | Hershey et al. | 73/593 |
| 5,475,597 | 12/1995 | Buck | 364/443 |
| 5,488,558 | 1/1996 | Ohki | 364/449 |
| 5,491,486 | 2/1996 | Welles, II et al. | 342/357 |
| 5,579,013 | 11/1996 | Hershey et al. | 342/357 |
| 5,610,815 | 3/1997 | Gudat et al. | 364/424.027 |
| 5,627,508 | 5/1997 | Cooper et al. | 340/425.5 |
| 5,719,771 | 2/1998 | Bock et al. | 364/443 |
| 5,721,685 | 2/1998 | Holland et al. | 364/449.1 |
| 5,731,997 | 3/1998 | Manson et al. | 364/559 |

OTHER PUBLICATIONS

Huang, Y.H., et al., "Hot–mix asphalt railroad trackbeds" *Transportation Research Record* (1986) 1095:102–110.

Jirsak, Z., "Vertical effects of vehicles on the bed" *DET Eisenbahntechnik* (1977) 25(4):166–169. An English abstract from Dialog File 63:TRIS is attached.

Lancaster, T., "Erosion and sediment control in a light railway system" *Public Works* (1993) 124(7):60.

Product brochure for Trimble PC V*trak*™ Vehicle Tracking Software, Vehicle Tracking & Communications Products, 645 North Mary Avenue, Post Office Box 3642, Sunnyvale, CA 94088, 2 pages total.

Product brochure for Series 0711 and Series 0713 Proportional Non–linear sensor, The Fredericks Company, 2400 Philmont Avenue, P.O. Box 67, Huntingdon Valley, PA 19006, 2 pages total.

Product brochure for Endevco Model 7290A Variable Capacitance Accelerometer, Endevco Corporation, 30700 Rancho Viejo Road, San Juan Capistrano, CA, 92675, 1 page total.

Product brochure for Placer™ GPS 300 Compact 6–Channel GPS Sensor & Antenna, Vehicle Tracking Products Division, 645 North Mary Avenue, Post Office Box 3642, Sunnyvale, CA 94088, 2 pages total.

Product brochure for SVeeSix Series 6–Channel GPS Receivers, OEM Sales, 645 North Mary Avenue, Post Office Box 3642, Sunnyvale, CA 94088, 2 pages total.

Profillidis, V.A., et al., "Elastoplastic study of the behavior of a railway track and its bed using the method of finite elements" *Bulletin de Liaison des Laboratoires des Ponts et Chaussees* (1986) 141:18–19. An English abstract from Dialog File 8:Ei Compendex Plus is attached.

Profillidis, V.A., "Three–dimensional elasto–plastic finite element analysis for track end structures" *Civil Engineering for Practicing and Design Engineers* (1985) 4(9):685–701.

Profillidis, V.A., "Applications of finite element analysis in the rational design of track bed structures" *Computers and Structures* (1986) 22(3):439–443.

Weil, G.J., "Non–destructive, remote sensing technologies for locating subsurface anomalies on railroad track beds" Proceedings of the International Society for Optical Engineering (1995) 2458:74–81.

Xuejun, D. "Computer analysis of stresses and strains in railway track structures" Proceedings of the Second International Conference on Computing and Civil Engineering (1985) Science Press, Beijing, China, Elsevier, Amsterdam, pp. 834–844.

METHOD AND APPARATUS FOR DETECTING RAILTRACK FAILURES BY COMPARING DATA FROM A PLURALITY OF RAILCARS

CROSS-REFERENCE TO RELATED APPLICATIONS

This application is a continuation of and claims the benefit and priority of U.S. application Ser. No. 08/829,771, filed Mar. 31, 1997, which claims the benefit and priority of U.S. Provisional Application Ser. No. 60/014,701, to Michael A. Bryan, filed Apr. 1, 1996, which are herein incorporated by reference for all purposes. Application Ser. No. 08/829, 771 was filed concurrently with Ser. Nos. 08/829,429, 08/829, 008, and 08/828,469, which are hereby incorporated by reference for all purposes.

This present invention relates to a technique for monitoring activity on mobile vehicles. More particularly, the invention is illustrated in an example related to monitoring rail track defects using a locatable rail car coupled to motion sensors and analyzing the track defects using a processing device.

The fixed rail transportation industry has been around in the United States since the industrial revolution. This type of transportation is used extensively today in moving both cargo and people from one geographical location to another geographical location. In the United States, numerous rail companies move millions of pounds of cargo, and thousands or even millions of people, throughout the continental United States yearly. In more densely populated countries such as Japan, "bullet trains" are used extensively to transport people from a busy metropolitan area such as Tokyo to Osaka or the like. In France, high speed rail systems such as the TGV continue to become more important as the population of the country increases. As such, there are literally thousands or even millions of miles of railroad tracks traversing the United States, among numerous other countries.

These railroad tracks, however, must be routinely inspected to prevent a possibility of track failure. Track failure often occurs by way of soil and gravel displacement, or erosion of timber that is used underlying the railroad tracks, for example. Unfortunately, track failure occurs at an alarming rate, which often leads to significant property damage and even death, in some cases.

In the United States, for instance, there are literally thousands of train related accidents due to track failures yearly. Literally tens of thousands of people are affected by way of environmental contamination caused by derailing train cars from track failure. Property damage caused by track failure is often in the millions of even billions of dollars yearly.

An article in the Los Angeles Times headlined "Tragedy on the Rails." This article stated that an eight car train carrying dangerous chemicals plunged from the rails and exploded in flames before dawn hurling a noxious cloud into the sky which forced the closing an interstate highway. Two bodies were found near the derailed train. A monstrous fire, throwing flames 600 to 800 feet in the air, burned bad and high causing significant damage to person and property. This article is merely one example of the type of damage caused by track failure.

Accordingly, industry has proposed some techniques in an attempt to prevent track failure. One of these techniques is to merely perform a visual inspection of the track during maintenance rounds. This visual inspection often involves railroad workers that walk down the track and visually look for possible track failures. This technique often requires large human capital and is not generally efficient for predicting the behavior of railroad tracks in a routine manner.

Other techniques have been proposed to detect certain defects in a rail way system using sensors. These techniques are, however, limited. In particular, they can only provide information for chronic or severe defects, which must be repaired immediately. These sensors are essentially "dumb" and cannot really be used to predict the future behavior of the railway system. Additionally, the techniques are generally in terms of providing sensing techniques for the rail car unit itself, similar to sensors used to track engine oil pressure, temperature, and the like. Accordingly, there are simply no effective techniques for identifying potential defects in the railroad assembly.

From the above, it can be seen that a technique for identifying potential defects on a railway system is often desirable.

SUMMARY OF THE INVENTION

According to the present invention, a technique including a system and method for detecting anomalies in a railway car system to predict track failures is provided. The present technique uses a plurality of sensing device including a tilt sensor and an accelerometer coupled to a global positioning sensor for detecting a presence of anomalies in a moving rail car vehicle for predicting a behavior of a railway system.

In a specific embodiment, the present invention provides a method of detecting conditions of a railway system to predict a possible track failure in the future. The method includes a step of detecting a first intensity value of an anomaly in a railway system using a first motion sensor operably coupled to a first moving rail car in a railway system and detecting a second intensity value of the anomaly in the railway system using a second motion sensor operably coupled to a second moving rail car in said railway system. A step of comparing the first intensity value to the second intensity value to identify a possible increase in a magnitude of the anomaly to predict a behavior of the anomaly.

In an alternative specific embodiment, the invention provides a method of detecting conditions of a railway system to predict a possible track failure. The method includes a step of detecting a plurality of intensity values of an anomaly in a railway system at a geographical location over time using a motion sensor operably coupled to a moving rail car in the railway system, and analyzing the intensity values of the anomaly to identify a possible increase in a magnitude of the anomaly over time to predict a behavior of the anomaly.

In a further alternative embodiment, the invention provides a system for detecting track failures in a railway system using tracking devices and a tracking station. The system includes a plurality of rail car units to be operable in a railway system and a tracking device coupled to each of the rail car units for detecting an anomaly in the railway system. The tracking device has a motion sensor to be coupled to a chassis of a rail car, a global positioning sensor (GPS) to be coupled to the chassis, and a processor coupled to the GPS and coupled to the motion sensor. The system also includes a tracking station for receiving data related to the anomaly from at least one of the tracking devices. The data is used to predict the future behavior of the railway system.

Numerous benefits are achieved over preexisting techniques using the present invention. In particular, the present invention provides a unique sensor arrangement for detecting anomalies over time in a railway system using a moving rail car. This technique can be implemented in conventional rail cars using simple bolt-on tools, which allow for easy retro-fitting of conventional rail cars. Additionally, the unique sensor arrangement provides automatic logging of events over time which may correspond to anomalies in an easy and accurate manner, without the use of human railway workers, who must generally walk down the rail track to identify possible defects thereon.

Furthermore, the present invention substantially reduces or even eliminates any subjectivity of analyzing a defect, which is often present using conventional human inspection techniques. Moreover, the present invention provides data to railway workers who can repair or replace possibly damaged sections of railroads to prevent the occurrence of accidents that can cause damage to railroad equipment, environment, and human beings, in some cases. Accordingly, the present invention uses the unique sensing device and tracking system for overcoming defects in present railway systems, thereby saving costs related to damage, possible damage to the environment from accidents, and human lives. These benefits and others are further described throughout this specification.

The present invention achieves these benefits in the context of known process technology. However, a further understanding of the nature and advantages of the present invention may be realized by reference to the latter portions of the specification and attached drawings.

DESCRIPTION OF SPECIFIC EMBODIMENTS

Figure 1:
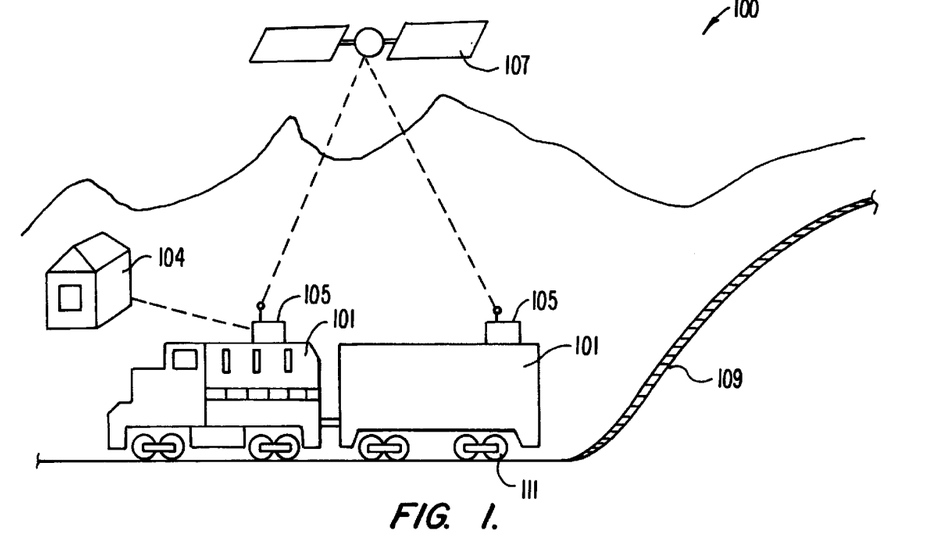
FIG. 1 is a simplified diagram of a rail car monitoring system according to the present invention.

FIG. 1 is a simplified diagram of a rail car system 100 according to the present invention. This diagram is merely an illustration and should not limit the scope of the claims herein. One of ordinary skill in the art would recognize other variations, modifications, and alternatives.

The rail car system 100 includes a variety of elements such as a rail car(s) 101, a tracking station 104, a tracking device(s) 105, a satellite 107, among other elements. As shown, the rail car 101 connects to one or more cars in a conventional manner and traverses along a track 109. In common terms, the connection of various rail cars as a unit is referred to as a train. The train often include a locomotive or engine car, which pulls or provides power to other car units. Storage cars connect to the engine car for carrying goods, chemical, people, and the like from one track location to another track location. A caboose connected to the end oversees the train operation.

Each rail car 101 includes typical elements such as ground wheels 111, which can run along track 109. The rail car 101 travels along railroad tracks found in almost any country and state. The rail car 101 also includes a tracking device 105, which monitors a variety of information derived from the rail car and the track. The tracking station 104 stores and analyzes the information derived from the tracking device on the rail car over time.

Figure 1A:
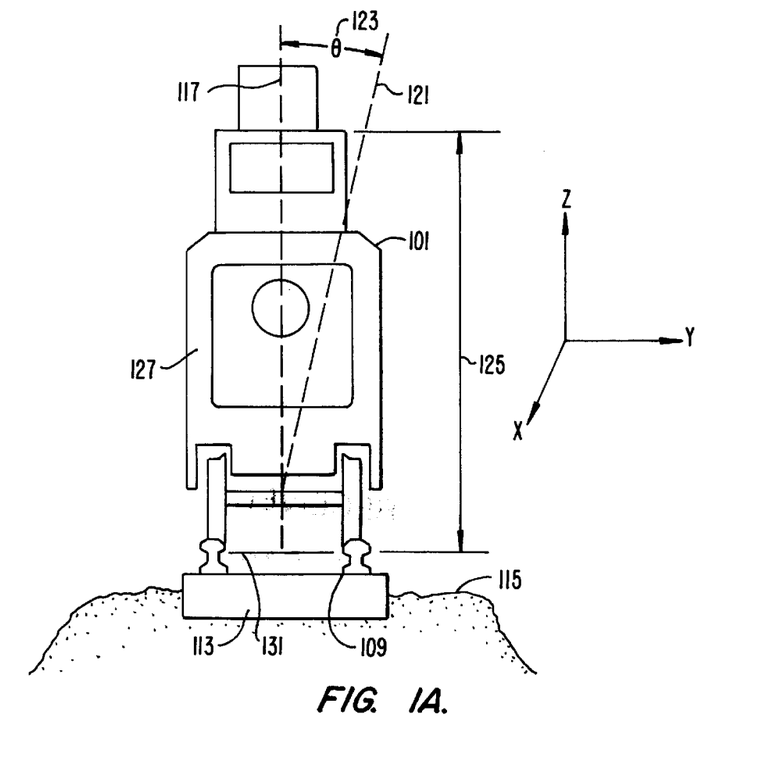
FIG. 1A is a simplified front-view diagram of the rail car of FIG. 1 according to the present invention.

FIG. 1A is a simplified front-view diagram of the rail car of FIG. 1 according to the present invention. This diagram is merely an illustration and should not limit the scope of the claims herein. This diagram is shown to illustrate the changes in acceleration and angle that the rail car undergoes when the rail car travels over an anomaly (e.g., broken track, displaced gravel, weak rail tie, cracked track) in the railroad track.

The rail car 101 traverses along track 109, which is placed on a railroad tie 113. Railroad tie 113 is provided on a bed of gravel 115 or the like. This gravel is often called packing. As the railroad tie or packing becomes defective, the rail car flexes the track portion with the anomaly, which deflects the rail car 101 in an angle θ 123 between a line 121 relative to a z-axis 117. The tracking device 104 includes a motion sensor that can detect the angle 123 and relative acceleration of the rail car 101. As the railroad tie 113 or packing 115 becomes even more defective, the angle of deflection or rail car acceleration can become even greater, which may indicate even a higher probability of track failure or the like.

In a preferred embodiment of the present invention, rail car variables are kept at relatively constant values as the rail car travels over the track section with the anomaly so that the motion sensor detects any slight changes to the anomaly over time. These variables include, among others, a speed of the rail car, weight of the rail car, sensor or tracking device placement (e.g., height and position relative to the underlying track). In a preferred embodiment, the tracking device 105 is mounted onto the rail car which has a relatively constant mass 127 relative to other trains and over time. An example of a constant mass car is the locomotive. In most cases, the weight of the locomotive is generally constant except for the weight of the fuel. The constant mass car provides a similar ride for the motion sensor or the tracking device. Accordingly, the rail car should experience greater movement only as a result of more severe damage to the underlying railroad assembly having the anomaly.

Preferably, the tracking device is placed near a top region of a locomotive, which allows for easier transmission of data from the tracking device to a wireless network, for example. In addition, the top of the locomotive has the greatest relative movement as compared to other car locations, which tends to provide better movement data. In other embodiments, the motion sensor is placed near the top region of the locomotive or other relatively constant mass cars. The tracking device or motion sensor should be placed at a certain height 125 and location 131 relative to the underlying railroad regardless of the type of rail car being used. This allows the tracking device to experience a similar height 125 and placement 131 environment regardless of the rail car.

Additionally, the rail car travels along a selected area of the railroad assembly, which has the anomaly, within a relatively constant speed range. This speed range should not vary greatly to provide accurate motion measurements based upon any change in the anomaly itself. The speed range should not vary greater than about a few miles per hour. A relatively constant speed range tends to ensure that the motion detector senses any change in the anomaly overtime, which is independent of the speed of the rail car.

Figure 2:
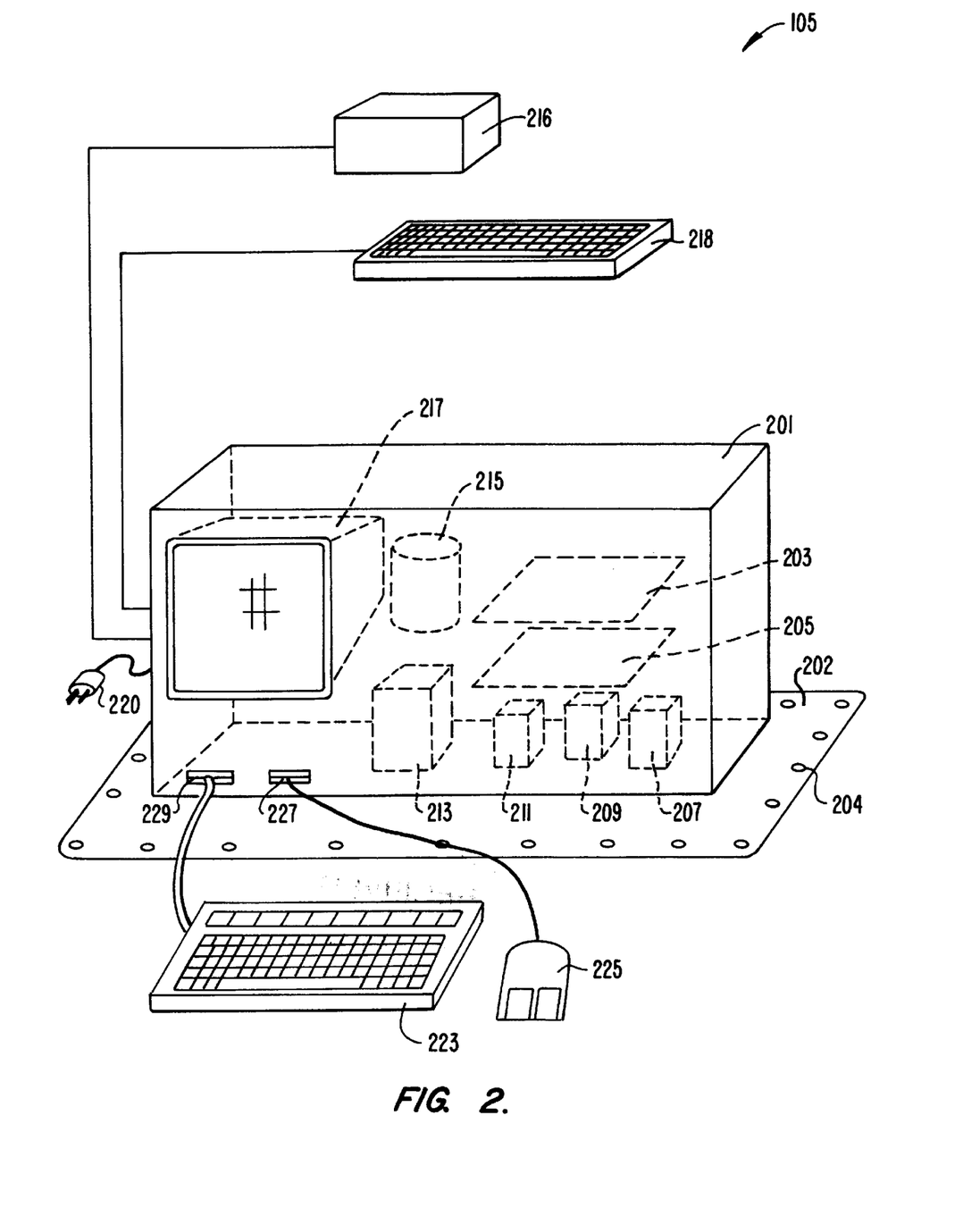
FIG. 2 is a simplified diagram of a device for the rail car of FIG. 1 according to the present invention.

FIG. 2 is a simplified diagram of a tracking device 105 according to the present invention. This is merely an example of a tracking device, which should not limit the scope of the claims herein. The tracking device 105 includes a housing 201. The housing 201 is made from a material that is suitable for use in an environment outside the rail car. The housing 201 can be made of a plastic or steel with sufficient resistance to weather and foreign objects, which can impact the housing 201 while the rail car traverse down the railroad track. The housing 201 is provided upon a flange 202, which includes a plurality of bolt holes 204 for fastening to an upper portion of the rail car. The flange 202 and bolt-on aspects of the housing allows for easy placement and removal of the tracking device 105 from the rail car for repair or analysis purposes.

The housing includes a variety of electronic elements or data acquisition units, which are used for tracking information derived from the moving rail car unit. These electronic elements include an accelerometer 207 operably coupled to an interface board 205, which is coupled to a central processing board 203. The accelerometer 207 provides rail car movement information to the central processing board 203 from the moving rail car. The movement information includes sudden changes in rail car acceleration, shock motion experienced by the rail car, and rail car vibration, in some cases. The movement information derived from the accelerometer can be sent to a memory 215 or logging device in housing 201, or sent to an outside user through a radio modem 211, which transmits the movement information via a wireless communication network.

As merely an example, the accelerometer may utilize variable capacitance microsensors. The accelerometer is designed for measurement of a relatively low level acceleration in a rail car unit in a railway system. The accelerometer also can detect sudden shock motion, constant acceleration, and even vibrations from the rail car unit caused by the rail car or an anomaly in the track. A product available which has these features is a variable capacitance accelerometer sold under the name of Endevco Model 7290A. This accelerometer can operate from 9.5 V to 18.0 V and provide a high level, low impedance output. A +/−2 volt differential output is dc coupled at a dc bias of approximately 3.6 volt. Frequency response is controlled by near-critical damped sensors. The use of gas damping results in a small thermally-induced change from frequency response. Again, the Endevco Model 7290A is merely an example, and should not limit the scope of the claims herein.

The data acquisition units in the tracking device 105 also includes a tilt sensor 209, which provides angular movement information to the central processing board 203 through the interface board 205. Similar to the information from the accelometer, the angular movement information can be transferred to memory 215 for logging purposes, or sent to an outside user through the radio modem 211. A tilt sensor is generally a proportional non-linear sensor. The tilt sensor should be able to detect slight changes in angle, which ranges from about 0 to about 2 degrees from a position normal to gravity. In certain embodiments, the tilt sensor should be operable in a range from about 0 to about 5 degrees, which will provide desired range characteristics.

The tilt sensor also should be able to operate in a variety of ambient conditions. In particular, the tilt sensor should operate in a temperature range from about −55 to about 100° C., which is much greater than temperatures encountered by a typical rail car unit. In most cases, however, the tilt sensor operates in a temperature range from about −55 to about 55° C. A characteristic time associated with the tilt sensor should be able to allow the meter to recover from changes in the tilt sensor angle. The characteristic time is preferably less than about 1 second and more preferably less than about 0.5 second. An output from the tilt sensor can be in voltage units or the like, depending upon the application. An example of a tilt sensor is a product sold by the Fredericks Company. This product is commonly referred to as a "single axis sensor." This sensor comes in Series 0711 and 0713 designs, which provide for proportional non-linear sensing.

A global positioning sensor (GPS) 213 another data acquisition unit is provided in the tracking device 105 to track a global position of the tracking device or of the moving rail car. GPS 213 includes a GPS receiver 216, among other elements. GPS 213 provides location information (e.g., longitude and latitude) to the central processing board 203 through the interface board 205. The location information is generally stored in memory 215, or transmitted to an outside user using the radio modem 211.

As merely an example, the GPS can be a product sold under the tradename of Placer™ GPS 300 made by Trimble Navigation. The GPS is a low-cost and high performance receiver and antenna. It is sufficiently rugged and lightweight, and housed all in a single package. The GPS mounts on both flat and curved surfaces, which may be ideal for the rail car. The GPS includes a standard RS-232 interface that outputs vehicle location messages in ASCII characters. Six channels allow for continuous tracking of the moving rail car. Output data includes a latitude, a longitude, a speed, a time, and a travel direction (e.g., north, south, east, west). Data acquisition time is less than two seconds in most cases. Position data can be updated once per second. Data can be transferred at baud rates of 300, 600, 1200, 2400, 4800, 9600, and others. Positional accuracy is within 2–5 meters under steady state conditions and about 15 meters under non-steady state conditions.

The GPS 300 can operate under a variety of conditions. For instance, it operates in a −40° C. to 70° C. temperature range. A non-operating temperature range is −55° C. to 85° C. The GPS can experience a shock of about 30 grams for 6 milliseconds. Operation also occurs in altitudes ranging from about −400 to +5,000 meters relative to sea level. Humidity can be 98%/66° C. The GPS is also generally weather-proof and dust proof, which are desirable features.

Other data acquisition devices include a speedometer for monitoring the speed of the rail car, a thermometer for monitoring the ambient temperature, a barometer for monitoring the pressure or altitude of rail car, and the like.

Power to the tracking device 105 is provided by way of various power sources. In particular, a photovoltaic array 218 may provide power to some of the electronic elements described above. The rail car also provides power to the tracking device 105 using a standard connection device 220. Optionally, the tracking device 205 includes a backup battery power supply for times when the main power sources are not available. Additionally, the battery power supply allows for the removal of the tracking device without any loss of information from memory 215.

A display 217 is coupled to the central processing board 203 through the interface board 205. The display can be a flat panel display or a cathode ray tube-type display. In preferred embodiments, the display is a flat panel display, which is generally more durable and resistant to the natural environment. The display is used to output information from the memory 215 and to program software for the present methods, which will be described in more detail below.

A keyboard 223 allows a user to access memory 215 of the tracking device 105 through the central processing board 203. Optionally, a mouse 225 is used to access information from memory 215 through the central processing board 203. The keyboard 223 and mouse 225 are easily connected to the tracking device 105 by way of ports 229 and 227, respectively. These ports are generally sealed to prevent foreign contaminants (e.g., water, dust, dirt) from entering housing 201 while the rail car is in operation. Keyboard 223, mouse 225, and display 217 are removable from tracking device 105. In a preferred embodiment of the present invention, in operation keyboard 223, mouse 225, and display 217 are not attached to tracking device 105. These items, however, are attached and used when the user down-loads data from memory 215 or up-loads programs to memory 215.

Figure 3:
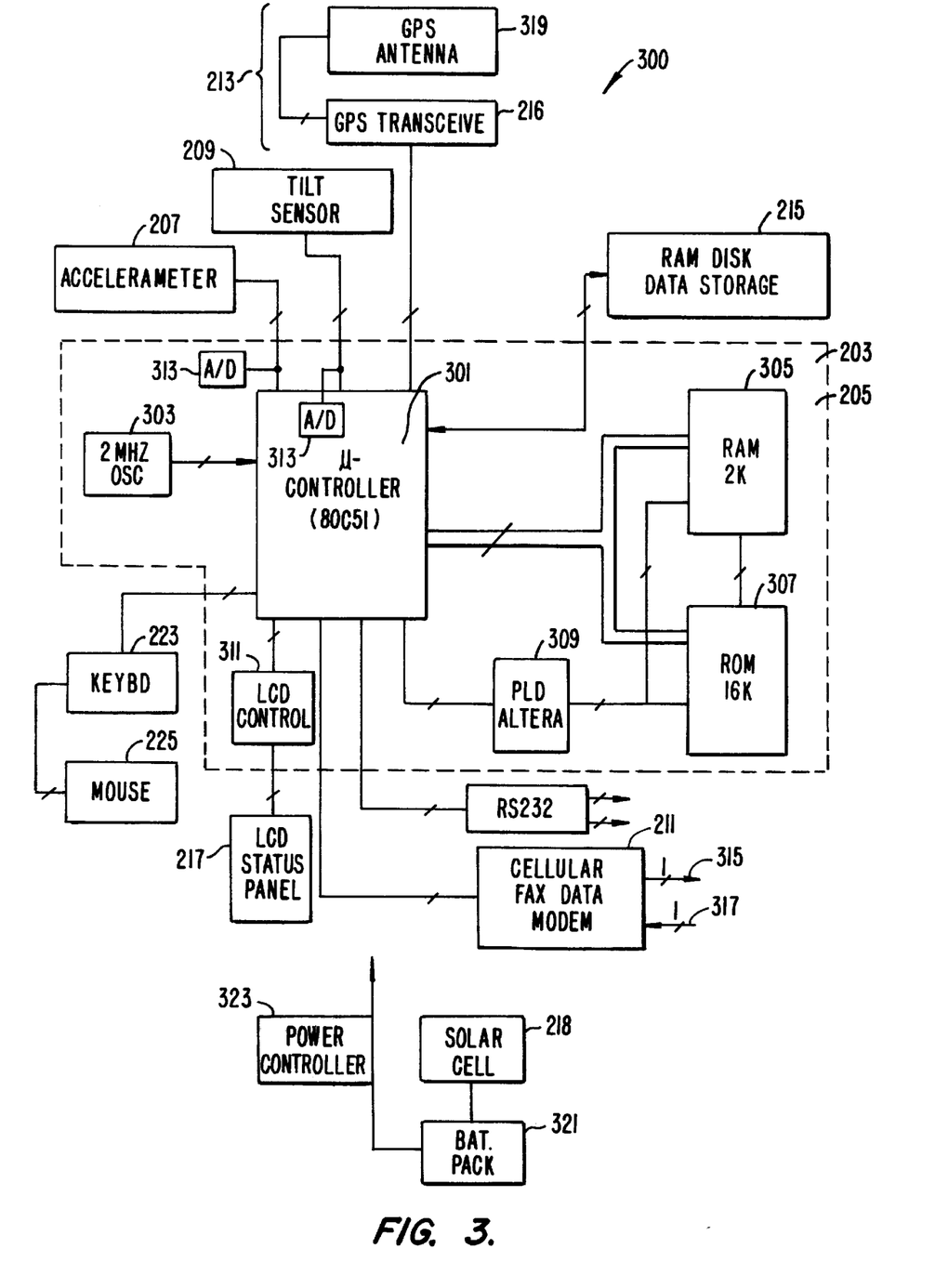
FIG. 3 is a more detailed block diagram of hardware for the device of FIG. 2 according to the present invention.

FIG. 3 is a more detailed block diagram 300 of hardware for the tracking device according to the present invention. This block diagram is merely an illustration and should not limit the scope of the claims herein. One of ordinary skill in the art would recognize other variations, modifications, and alternatives.

The block diagram 300 includes a preferred embodiment of numerous common elements to the ones described in FIG. 2, for example. Many of these elements are referenced using the same numerals for easy reading and cross-referencing. As shown, the block diagram includes devices, which would be found on the central processing board 203 and interface board 205. For instance, the central processing board 203 would include a microprocessor 301.

Microprocessor 301 is connected to a clock or oscillator 303 for providing clock signals to the microprocessor 301. A variety of computer readable memory chips, including a random access memory chip 305, a read only memory chip 307, and a programmable logic chip 309, are connected or coupled to the microprocessor 301. An LCD controller chip 311 interfaces between the microprocessor and display 217, which is an LCD panel in this embodiment. The RS-232 port is coupled to the microprocessor. The keyboard 223 and mouse 225 are also coupled to the microprocessor. Additionally, the accelerometer 207 and the tilt sensor 209 are coupled to the microprocessor 301 through A/D converters 313, which change the analog signals from these devices into digital.

Modem 211 is a cellular facsimile and data modem, which is connected to the microprocessor 301. Modem 211 transmits 315 and receives 317 signals from a user at a tracking station or central processing office, for example. These signals include data related to time, location (e.g., latitude and longitude), speed, direction, acceleration, tilt, and others. Additionally, control signals may be transmitted and received from the modem 211.

The GPS sensor, including a transceiver 216 and antenna 319, are coupled to the microprocessor 301. Power is provided to the above devices using the photovoltaic array or solar cell 218. Backup battery power is provided using a battery power source 321. To ensure that the power is maintained reliably, a power controller 323 interfaces between the power sources and the devices, e.g., microprocessor, memory. Data storage is provided using a memory 215 in the form of a random access memory disk data storage unit.

Figure 4:
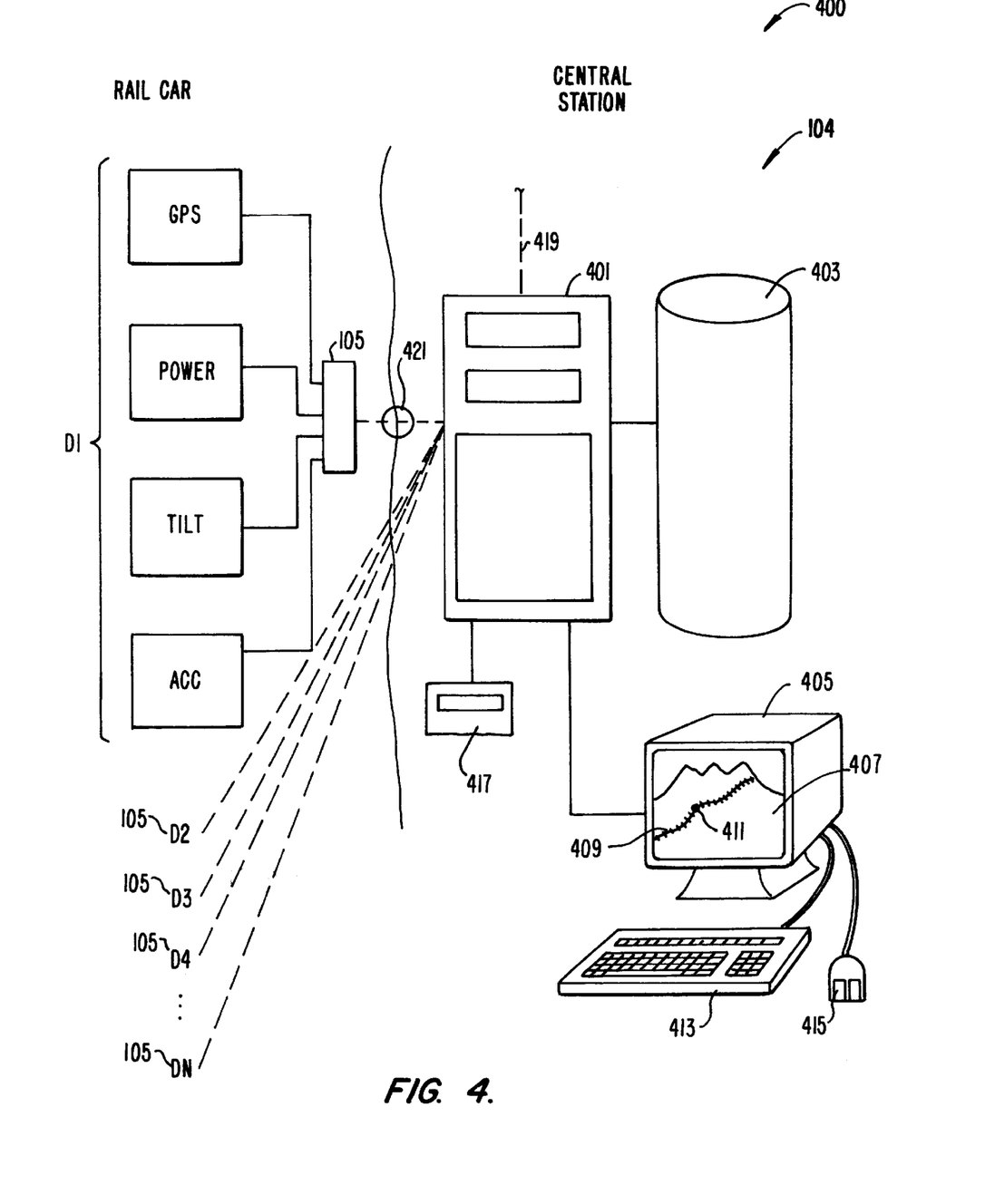
FIG. 4 is a block diagram of the rail car monitoring system according to the present invention.

FIG. 4 is a block diagram of a rail car monitoring system 400 according to an alternative aspect of the present invention. The rail car monitoring system 400 includes 400 a plurality of tracking devices (D1, D2, D3, D4 . . . DN) 105, the tracking station or central processing facility 104, among other features. This diagram and merely an illustration and should not limit the scope of the claims.

Each of the tracking devices 105 is fitted onto a rail car such as the one described. The rail car traverses successively along a railway route depending upon the train schedule. The tracking device monitors rail car information as the rail car traverses along the track. Each of the rail cars provide rail car information about a selected section of track and time to the tracking station, which records and analyzes the rail car information over time.

The tracking station 104 receives the rail car information from the tracking device in each rail car 105 through a variety of techniques. In particular, the tracking device transmits the rail car information via modem directly to the tracking station in a continuous or in-situ manner. Alternatively, the tracking device transmits the rail car information directly to the tracking station in a periodic manner, e.g., time, location, amount of data. Alternatively, the tracking device stores the rail car information within memory, which will be stored there until the information is transferred at the tracking station 104. Alternatively, the tracking device transmits the rail car information through a depository 421, which is in communication with the central office 401. The depository 421 can be defined along the railway system and transmits the rail car information via a communication network such as a satellite network, a wireless network, a wide area network, a cellular network, the Internet, and the like to the tracking station 104.

Tracking station 104 includes a large processing device 401, which processes a large quantity of rail car information from the numerous rail cars in tracking devices in the railway system. The large processing device is often a main frame computer such as a UNIX machine, a high end workstation, or a personal computer, in some cases. The processing device 401 stores the rail car information in a computer readable storage device 403. The storage device 403 can be in the form a disk storage (e.g., RAID), a floppy storage, a tape storage, optical storage such as CD ROM, DRAM, SRAM, or the like. The storage device 403 preferably has sufficient memory capability and is easily upgradable for higher levels of memory. Rail car information can be output from the storage device 403 through the processing device 401 to a printer 417 or other output devices. A user interface in the form of a display 405 is coupled to the processing device 401. The user interface also includes a keyboard 413 and a mouse 415.

The processing device 401 accesses specialized software typically stored in storage device 403 that analyzes the rail car information to identify a potential defect in the railway system, e.g., track. The defect can be defined as an anomaly in the track or track assembly that requires at least a detailed inspection of the track and may require repair of the track to prevent a possibility of track failure. In an embodiment, the processing device 401 displays the defect in the form of an icon 409 on a computer generated map 407, which displays the icon based upon latitude and longitude data from the GPS sensor. The processing device 401 can also be coupled to a common wide area network 419 using a TCP/IP transmission scheme. Further techniques using the rail car monitoring system are described below and illustrated by way of FIGS. 5–6.

A method according to an embodiment of the present invention may be briefly outlined as follows.

(1) Provide a tracking device onto a rail car;
(2) Monitor rail car information (e.g., location, changes in acceleration, changes in angle) over a selected railway route using the tracking device;
(3) Transfer rail car information from the tracking device to a tracking station;

(4) Identify a possible anomaly in a selected region of the railway system using the rail car information to create a data point for the anomaly;

(5) Repeat steps (2) and (4) for different rail cars and times for a plurality of data points;

(6) Compare the plurality of data points to predict a future behavior of the selected region of the railway system;

(7) Call maintenance crew to repair selected track section; and (8) Repair selected track section.

The above sequence of steps uses rail car information which is retrieved over time to predict the future behavior of a selected region of a railway. This sequence of steps is merely an illustration and should not limit the scope of the claims herein. One of ordinary skill in the art would recognize other modifications, variations, and alternatives. Details of the sequence can be illustrated by way of the description below and FIG. 5, for example.

Figure 5:
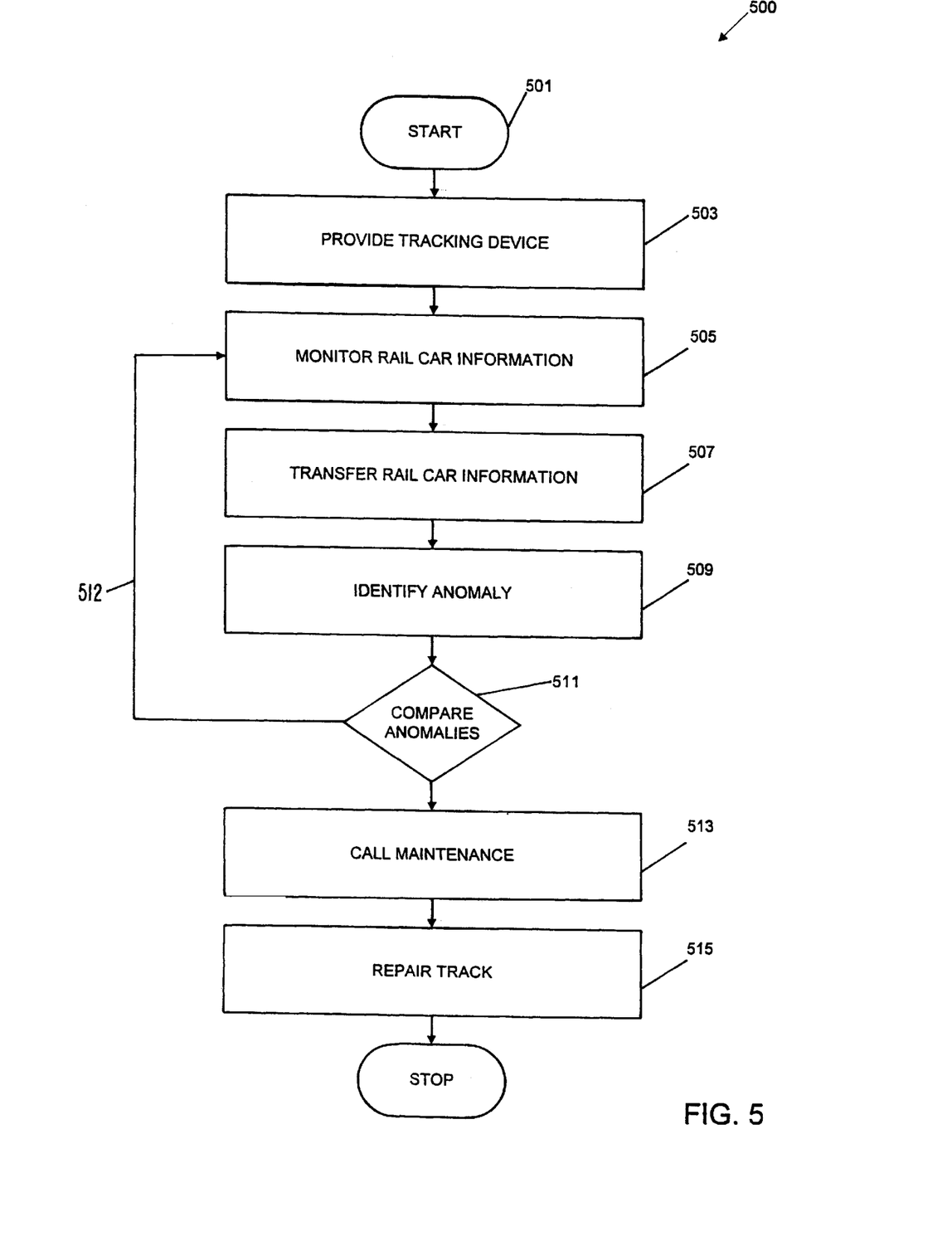
FIG. 5 is a simplified flow diagram of a rail car monitoring method according to the present invention.

The method 500 begins at step 501. In particular, the method uses a tracking device, which is placed (step 503) onto a rail car. As previously discussed, the tracking device includes an accelerometer, a tilt sensor, and other elements. The tracking device monitors (step 505) movement of the rail car unit as it travels down a railway. This rail car information (e.g., location, changes in acceleration, changes in angle, time, speed, direction) is tracked over a selected railway route using the tracking device. The rail car information is transferred from the tracking device to the tracking station, where data is collected an analyzed. The tracking station identifies a possible anomaly (step 507) in a selected region of the railway system using the rail car information. Overtime, the tracking station receives additional data of the anomaly from rail cars over the selected region to create a plurality of data points, such as ones illustrated by FIG. 6, for example. These data points are compared (step 511). If the last data point received is outside of a control limit, a request (step 513) is sent to a maintenance group, which will go to the track location having the anomaly to inspect and/or repair (step 515) it. Alternatively, the method continues to procure additional rail car information about the anomaly via branch 512. Details of analyzing the data points can be illustrated by way of FIG. 6 below.

Figure 6:
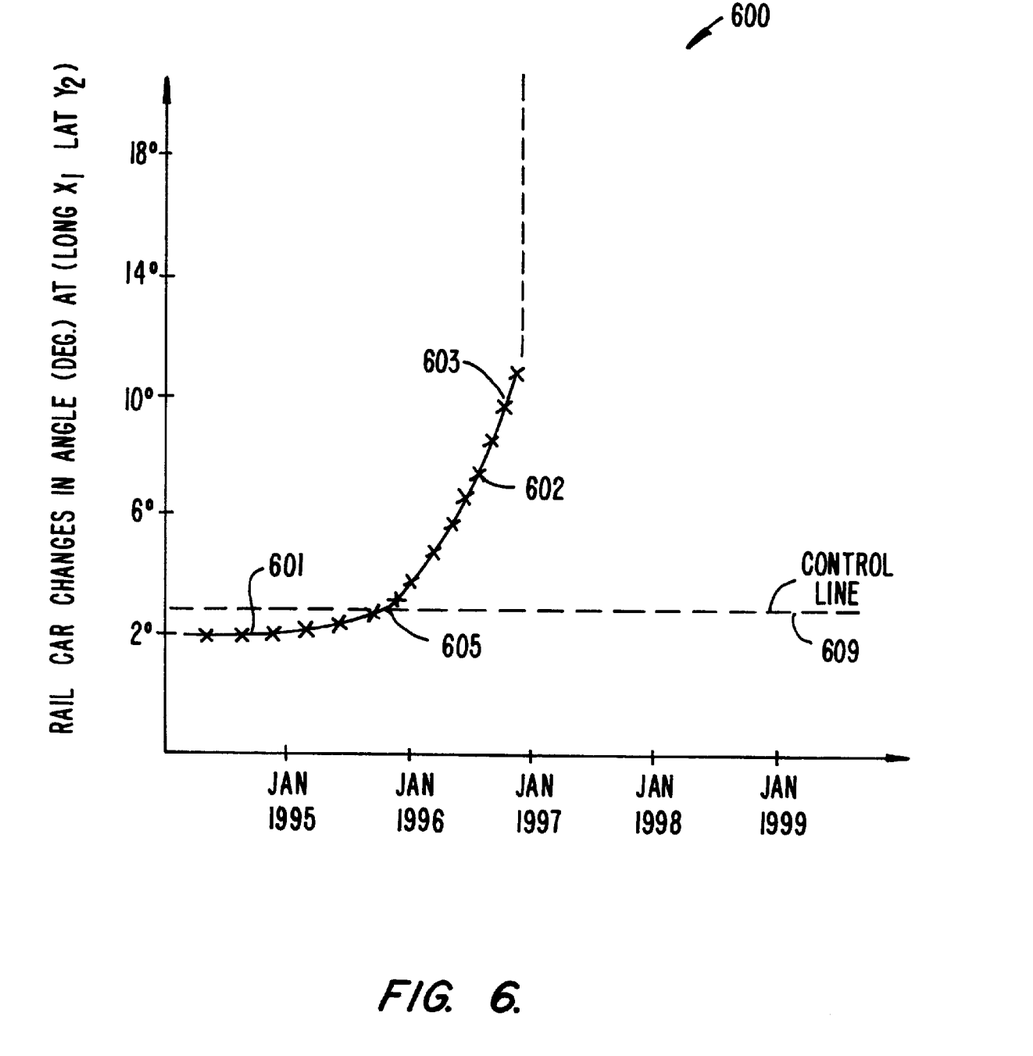
FIG. 6 is a simplified chart of a rail car monitoring method according to the present invention.

FIG. 6 illustrates 600 rail car angle on a vertical axis plotted against time on a horizontal axis. The tracking station has a processor and memory storage for providing data to form the relationship shown by FIG. 6. Each data point 602 represents an angle value of the rail car recorded by the tilt meter. A GPS sensor provides the geographical location of the rail car at the location where each data point is recorded. Numerous trains pass over the selected region having the anomaly to create the points along line 601, which is generally constant in value. As the anomaly becomes more severe, the rail car moves in a larger angle as it travels over the anomaly, as illustrated by the line portion beginning at 605. This angle becomes progressively larger 603, until the track ultimately fails, which is illustrated by line 607. The tracking station monitors the changes in rail car angle over time and sends a maintenance crew out to the track section when the angle exceeds a certain threshold or control line, such as the line 609. The maintenance crew receives a work request or maintenance sheet from the tracking station. The maintenance crew goes out to the section of track based upon the information provided by the GPS unit. An inspection and/or repair of the track section takes place. This allows for maintenance crews to repair track sections using the information provided by the rail car information accumulated over time before track failure.

While the above description is in terms of tracking changes in angle in a moving rail car unit, it would be possible to track other variables. For instance, the tracking system can also detect for lateral acceleration, a combination of angle and acceleration, lateral acceleration in relation to ambient temperature, rail car speed, and the like. Additionally, the relationship between the angle and time is in terms of absolute values. But it would be recognized that the relationship could be in terms of a relative value, a calibrated value, or the like. Furthermore, conventional statistical process control techniques may be used to analyze the rail car information in various formats. Moreover, the tracking device is described in terms of a combination of hardware and software elements. These hardware and software elements are not intended to limit the scope of the claims. One of ordinary skill in the art would recognize that the functionality of the hardware and software elements can be further combined, or even separated, in additional hardware or software features.

The invention has now been explained with reference to specific embodiments. Other embodiments will be apparent to those of ordinary skill in the art in light of the disclosure. In particular, the above hardware and software can be separated by functions for certain applications or further combined, if necessary. It is therefore not intended that this invention be limited, except as indicated by the appended claims.

What is claimed is:

1. A method of detecting conditions of a railway system to predict a possible track failure, said method comprising:

detecting a first intensity value of an anomaly in a railway system using a first motion sensor operably coupled to a first moving rail car in a railway system;

detecting a second intensity value of said anomaly in said railway system using a second motion sensor operably coupled to a second moving rail car in said railway system; and comparing said first intensity value to said second intensity value to identify a possible increase in a magnitude of said anomaly to predict a behavior of said anomaly.

2. The method of claim 1 further comprising identifying a track location of said anomaly using a positioning system operably coupled to said first moving rail car.

3. The method of claim 1 further comprising identifying a track location of said anomaly using a global positioning sensor operably coupled to said second moving rail car.

4. The method of claim 1 further comprising detecting a third intensity value of said anomaly using a third motion sensor operably coupled to a third rail car.

5. The method of claim 1 wherein said first moving rail car detects the first intensity value at a time substantially different from when said second moving rail car detects the second intensity value.

6. The method of claim 1 wherein said detecting of said first intensity value occurs at a different time from said detecting of said second intensity value.

7. The method of claim 1 wherein said anomaly is a rail track defect, said rail track defect is selected from a group consisting of a faulty rail tie, a faulty track, soil displacement, gravel displacement, and erosion of timber.

8. The method of claim 7 wherein the behavior is a possibility of a rail car derailment.

9. The method of claim 1 further comprising storing said first intensity value and said second intensity value in a memory.

10. The method of claim 1 wherein said first intensity value is detected at a first time and said second intensity value is detected at a second time, said first time occurring before said second time.

11. A method of detecting conditions of a railway system to predict a possible track failure, said method comprising:

detecting a plurality of intensity values of an anomaly in a railway system at a geographical location over time using a motion sensor operably coupled to a moving rail car in said railway system; and analyzing said intensity values of said anomaly to identify a possible increase in a magnitude of said anomaly over time to predict a behavior of said anomaly.

12. The method of claim 11 further comprising ascertaining said geographical location of said anomaly using a global positioning sensor operably coupled to said moving rail car in said railway system.

13. The method of claim 11 wherein said anomaly is a rail track defect, said rail track defect is selected from a group consisting of a faulty rail tie, a faulty track, soil displacement, gravel displacement, and erosion of timber.

14. The method of claim 13 wherein the behavior comprises a rail car derailment.

15. The method of claim 11 further comprising storing said intensity values in a memory.

16. A system for detecting track failures in a railway system, said system comprising:

a plurality of rail car units to be operable in a railway system;

a tracking device on each of said rail car units for detecting an anomaly in said railway system, said tracking device including:

a sensor comprising a motion sensor to be coupled to a chassis of a rail car;

a global positioning sensor (GPS) to be coupled to said chassis; and a processing means coupled to said GPS and coupled to said motion sensor for detecting a magnitude value of the anomaly at a geographical location over time and for comparing said magnitude value to previously detected values to identify a possible increase in the magnitude of said anomaly to predict a behavior of said anomaly; and a tracking station for receiving data related to said anomaly from tracking device.

* * * * *